No. 853,533. PATENTED MAY 14, 1907.
A. BYRD.
FOOT BATH FOR HORSES AND MULES.
APPLICATION FILED SEPT. 14, 1905.

Witnesses:
R. E. Hamilton
J. Morris

Inventor:
Atvill Byrd
By F. G. Fischer Atty.

UNITED STATES PATENT OFFICE.

ATVILL BYRD, OF KANSAS CITY, MISSOURI.

FOOT-BATH FOR HORSES AND MULES.

No. 853,533.  Specification of Letters Patent.  Patented May 14, 1907.

Application filed September 14, 1905. Serial No. 278,520.

*To all whom it may concern:*

Be it known that I, ATVILL BYRD, a citizen of the United States, residing at Kansas City, in the county of Jackson and State of Missouri, have invented certain new and useful Improvements in Foot-Baths for Horses and Mules, of which the following is a specification.

My invention relates to improvements in foot-baths for horses and mules; my object being to furnish an improved foot-bath of simple construction and arrange the same adjacent to a water-trough so that the animals will be compelled to stand in said foot-bath while drinking. By thus wetting their feet on an average of three times a day contraction of the hoofs will be avoided, fever will be withdrawn from the feet, and as the latter will be kept fairly clean thrush and other diseases caused by the accumulation of foreign matter around the frogs of the hoofs will be avoided.

The advantages derived from keeping a horse's feet moist are well known and in order to obtain these advantages it is customary to pack the bottom of the feet with wet clay. This operation requires considerable time and labor, and, besides, does not produce the good results obtained by the use of my invention. In order that the latter may be fully understood, reference will now be made to the accompanying drawing, in which:—

Figure 1:
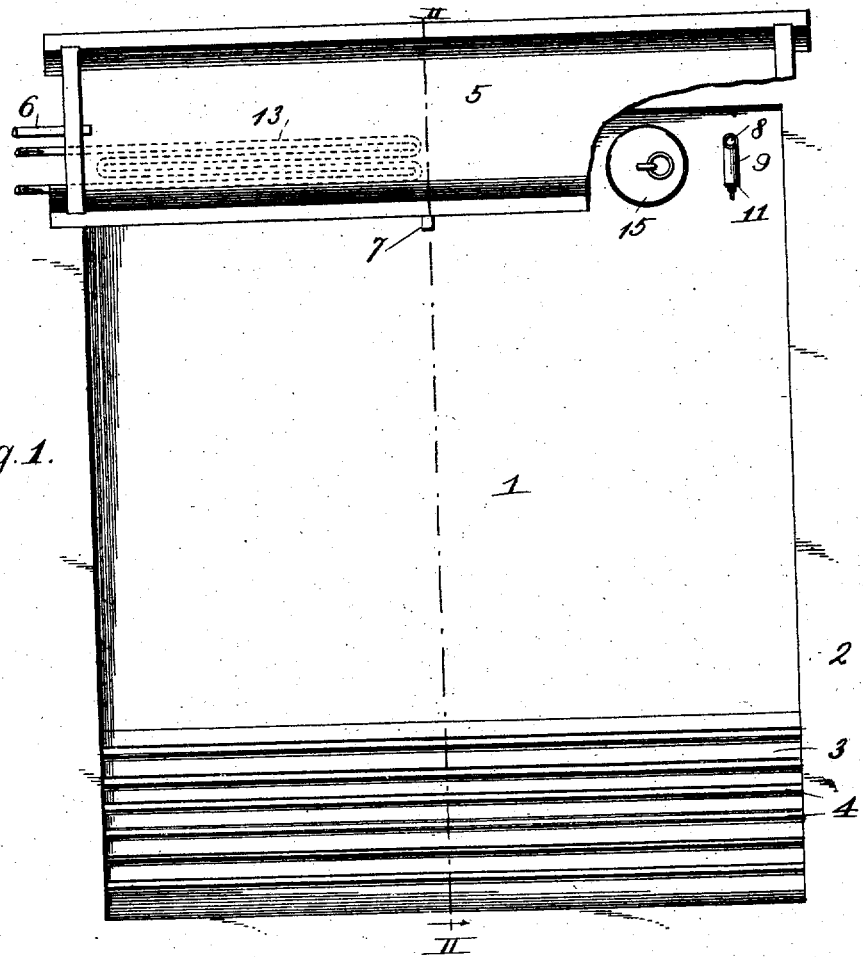
Figure 2:
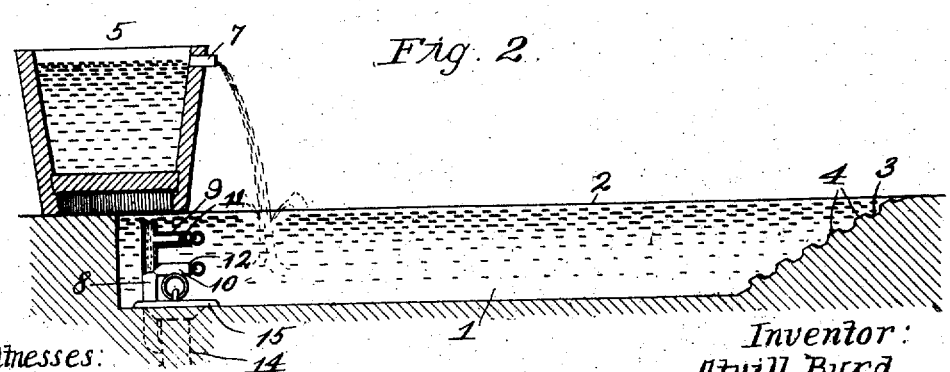

Figure 1 represents a plan view of the invention with the water-trough partly broken away. Fig. 2 is a vertical longitudinal section of same taken on line II—II of Fig. 1.

In carrying out the invention, I employ a tub 1 of sufficient length for a horse to stand therein. Said tub is permanent and preferably countersunk below the level of floor 2, and consists of any suitable material that will hold water. The front wall 3 of the tub is inclined and provided with transverse corrugations 4 so that the animals may safely enter and leave said tub.

5 designates a water-trough arranged transversely across the rear end of the tub and provided with a supply-pipe 6 and a discharge pipe 7 through which latter the surplus water discharges into the tub, as clearly shown in Fig. 2.

The water in the tub may be retained at three different levels through the instrumentality of an overflow pipe 8, reaching almost to the top of the tub, and two branch-pipes 9 10 communicating with pipe 8. Pipe 9 is arranged vertically above pipe 10, and the inlet ends of said pipes are provided with removable plugs 11 13, respectively, thus in very warm weather when it is desired to quickly reduce the temperature of an animal by allowing it to stand knee-deep in water the branch pipes are closed so that the water will be maintained on a level with the upper end of pipe 8.

In cold weather the water may be maintained at either of the lower levels by the proper manipulation of plugs 11 12, and during said weather the water is heated to a comfortable temperature by steam or hot water circulating through a coiled pipe 13 communicating with a suitable heater. By thus heating the water during cold weather it may be employed to advantage in washing the limbs of an animal while it stands in the tub.

The lower end of pipe 8 communicates with a sewer-pipe 14 the upper end of which latter communicates with the bottom of the tub so that said tub may be quickly emptied and flushed by removing a plug 15 normally closing the upper end of the sewer-pipe. Overflow pipe 8 and its branches, together with coiled pipe 13 and plug 15 are arranged beneath the trough so as to be out of the way of the animal standing in the tub.

While the bath owing to its low cost could be employed to advantage in a stable containing but one or two animals, it is particularly advantageous when installed in large barns because the time and labor now required in wetting the feet of the animals may be saved as this operation can be performed while they drink.

Having thus described my invention, what I claim and desire to secure by Letters-Patent, is:—

1. A shallow tub permanently countersunk into a stable floor and having an inclined corrugated wall, means for supplying the tub with water, an overflow pipe leading therefrom, and means for admitting water to said overflow at different levels.

2. A shallow permanent tub, means for supplying it with running water, an overflow pipe leading therefrom, branches in said pipe at different levels, means for controlling the inlets of said branches, and a waste pipe leading from the tub to the sewer and normally closed with a plug.

3. A countersunk tub, an overflow pipe leading from said tub and extending almost to the top of the latter, a branch-pipe communicating with said overflow pipe, and means for controlling the inlet end of said branch pipe.

4. A countersunk tub, an overflow pipe leading therefrom, branch pipes communicating at different heights with said overflow pipe, and plugs for controlling the inlet ends of said branch pipes.

5. In a foot bath for stock, a foot tub, combined with a watering trough so near the tub that an animal using the trough must stand in the tub, and means for maintaining water in both tub and trough.

6. In a foot bath for stock, a foot tub, combined with a watering trough located above the forward end of the tub so that an animal using the trough must stand in the tub, means for supplying water to both trough and tub, an exhaust for the former, and an exhaust for the latter located beneath the trough.

7. In a foot bath for stock, a foot tub, combined with a watering trough so near the tub that an animal using the trough must stand in the tub, means for supplying water to the trough, an overflow spout for the latter delivering into the tub, and an overflow for the tub.

8. In a foot bath for stock, a foot tub, combined with a watering trough so near the tub that an animal using the trough must stand in the tub, means for supplying water to the trough, an overflow spout for the latter delivering into the tub, and an overflow for the tub located in the part thereof which is beneath the trough.

9. In a foot bath for stock, a tub countersunk in the floor, combined with a watering trough so near the tub that an animal using the trough must stand in the tub, means for supplying water to the trough, an overflow spout for the latter delivering into the tub, an overflow for the tub located in that part thereof which is beneath the trough, and means for regulating the height at which this overflow shall act.

In testimony whereof I affix my signature, in the presence of two witnesses.

ATVILL BYRD.

Witnesses:
J. W. BOLING,
F. G. FISCHER.